United States Patent
Wang

(10) Patent No.: US 10,231,432 B2
(45) Date of Patent: Mar. 19, 2019

(54) PET GROOMING TOOL WITH REPLACEABLE COMB PLATES

(71) Applicant: Huo-Pia Wang, Chang-Hua (TW)

(72) Inventor: Huo-Pia Wang, Chang-Hua (TW)

( * ) Notice: Subject to any disclaimer, the term of this patent is extended or adjusted under 35 U.S.C. 154(b) by 312 days.

(21) Appl. No.: 15/257,015

(22) Filed: Sep. 6, 2016

(65) Prior Publication Data
US 2018/0064065 A1  Mar. 8, 2018

(51) Int. Cl.
| | | |
|---|---|---|
| A01K 13/00 | (2006.01) | |
| B25G 3/26 | (2006.01) | |
| B25G 1/00 | (2006.01) | |
| B25G 3/18 | (2006.01) | |

(52) U.S. Cl.
CPC .............. *A01K 13/002* (2013.01); *B25G 1/00* (2013.01); *B25G 3/18* (2013.01); *B25G 3/26* (2013.01)

(58) Field of Classification Search
USPC ........ 119/612, 611, 613–620, 625–633, 664; D30/158, 159; 15/142, 236.01
See application file for complete search history.

(56) References Cited

U.S. PATENT DOCUMENTS

| | | | | |
|---|---|---|---|---|
| 5,339,840 | A * | 8/1994 | Koppel | A01K 13/002 119/625 |
| 8,408,161 | B2 * | 4/2013 | Lin | A01K 13/002 119/625 |
| 2008/0078333 | A1 * | 4/2008 | Wang | A01K 13/002 119/611 |
| 2009/0084233 | A1 * | 4/2009 | Rosso | B25G 3/26 81/491 |
| 2009/0126648 | A1 * | 5/2009 | Porter | A01K 13/002 119/601 |
| 2009/0126649 | A1 * | 5/2009 | Porter | A01K 13/002 119/601 |
| 2011/0138566 | A1 * | 6/2011 | Wang | A47L 13/08 15/236.01 |
| 2016/0073612 | A1 * | 3/2016 | Cafasso | A45D 24/10 119/601 |
| 2017/0071156 | A1 * | 3/2017 | Cafasso | A01K 13/002 |

FOREIGN PATENT DOCUMENTS

GB          2378149 A  *  2/2003  ............... B25G 3/28

* cited by examiner

*Primary Examiner* — Andrea M Valenti
(74) *Attorney, Agent, or Firm* — Trop Pruner & Hu, P.C.

(57) ABSTRACT

A pet grooming tool includes a tool body extending longitudinally and having a transverse insert slot and a latch displacing space communicated with the insert slot, a latch member displaceable in the latch displacing space to insert a latch portion into the insert slot in a latch position so as to retain an insert plate portion of a comb plate in the insert slot, and to retreat into the latch displacing space in an unlatch position so as to permit removal of the comb plate from the tool body for replacement.

10 Claims, 15 Drawing Sheets

PET GROOMING TOOL WITH REPLACEABLE COMB PLATES

FIELD

The disclosure relates to a pet grooming tool, and more particularly to a pet grooming tool with replaceable comb plates for different use.

BACKGROUND

A conventional pet grooming tool with replaceable comb heads as disclosed in Taiwanese Patent No. M370331 generally includes a tubular handle and a plurality of comb heads. Each of the comb heads has a shaft portion detachably coupled with an end of the handle and locked by means of a collar locking device. By operating a shifter to rotate a ring sleeved on the end of the handle, a collar fixed on the handle is unlocked so as to permit removal of the comb head from the handle for replacement of another comb head. Such pet grooming tool has a large number of components, thereby resulting in a higher manufacturing cost and inconvenience during assembly.

SUMMARY

Therefore, an object of the disclosure is to provide a pet grooming tool has a simple construction and that is easy to fabricate at a relatively low manufacturing cost.

According to the disclosure, the pet grooming tool includes a tool body having a handle portion and an insert slot which are disposed opposite to each other in a longitudinal direction. The insert slot is defined by front and rear wall surfaces which are disposed opposite to each other in the longitudinal direction and each of which extends in a first transverse direction that is transverse to the longitudinal direction. The tool body further has a latch displacing space which extends therein from the insert slot and which defines a latch displacing path. The pet grooming tool further includes a latch unit. The latch unit includes a latch member having a latch portion which is disposed to be displaceable along the latch displacing path between an unlatch position, where the latch portion is disposed in the latch displacing space, and a latch position, where the latch portion is disposed in the insert slot, and a biasing member disposed in the latch displacing space to bias the latch portion to the latch position. The pet grooming tool further includes a plurality of comb plates, each having an insert plate portion which is configured to be inserted into the insert slot in the first transverse direction, and which has two plate major surfaces that are configured to be attached to the front and rear wall surfaces, respectively, a latch hole that extends from one of the plate major surfaces toward the other one of the plate major surfaces and that is registered with the latch displacing path when the insert plate portion is inserted into the insert slot so as to permit retaining of the latch portion in the latch hole when the latch portion is in the latch position, and a plate minor surface that interconnects the plate major surfaces and a comb portion which extends from the plate minor surface in the first transverse direction to project outwardly of the tool body.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
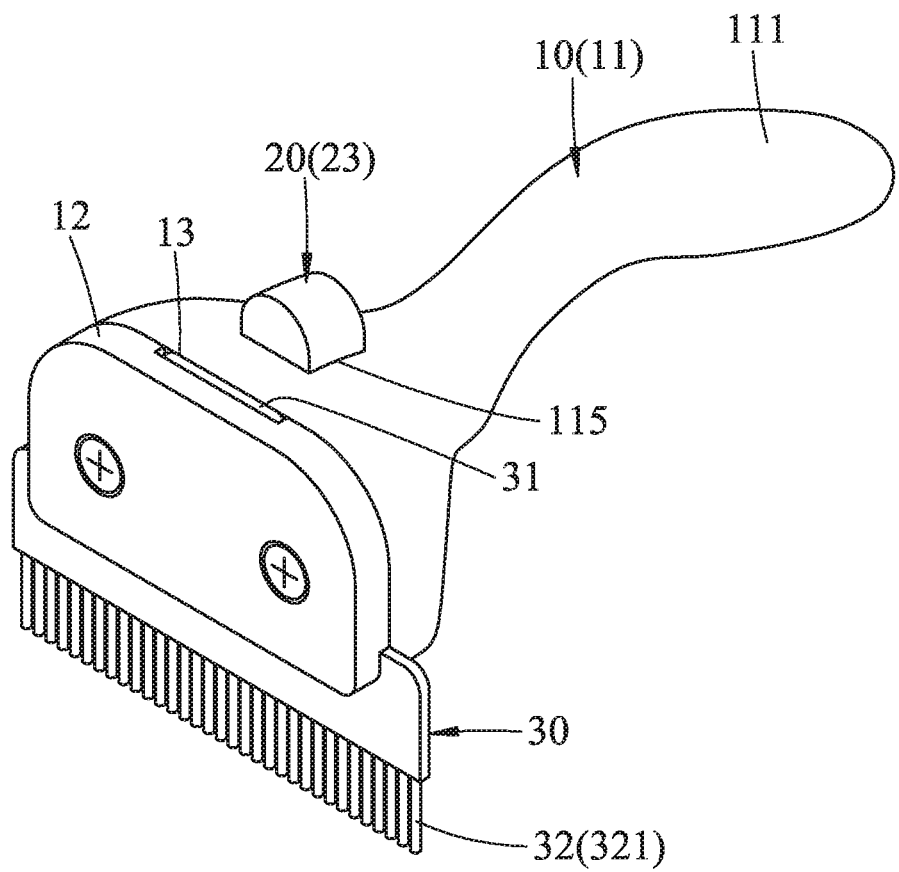
FIG. 1 is a perspective view of a first embodiment of a pet grooming tool according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
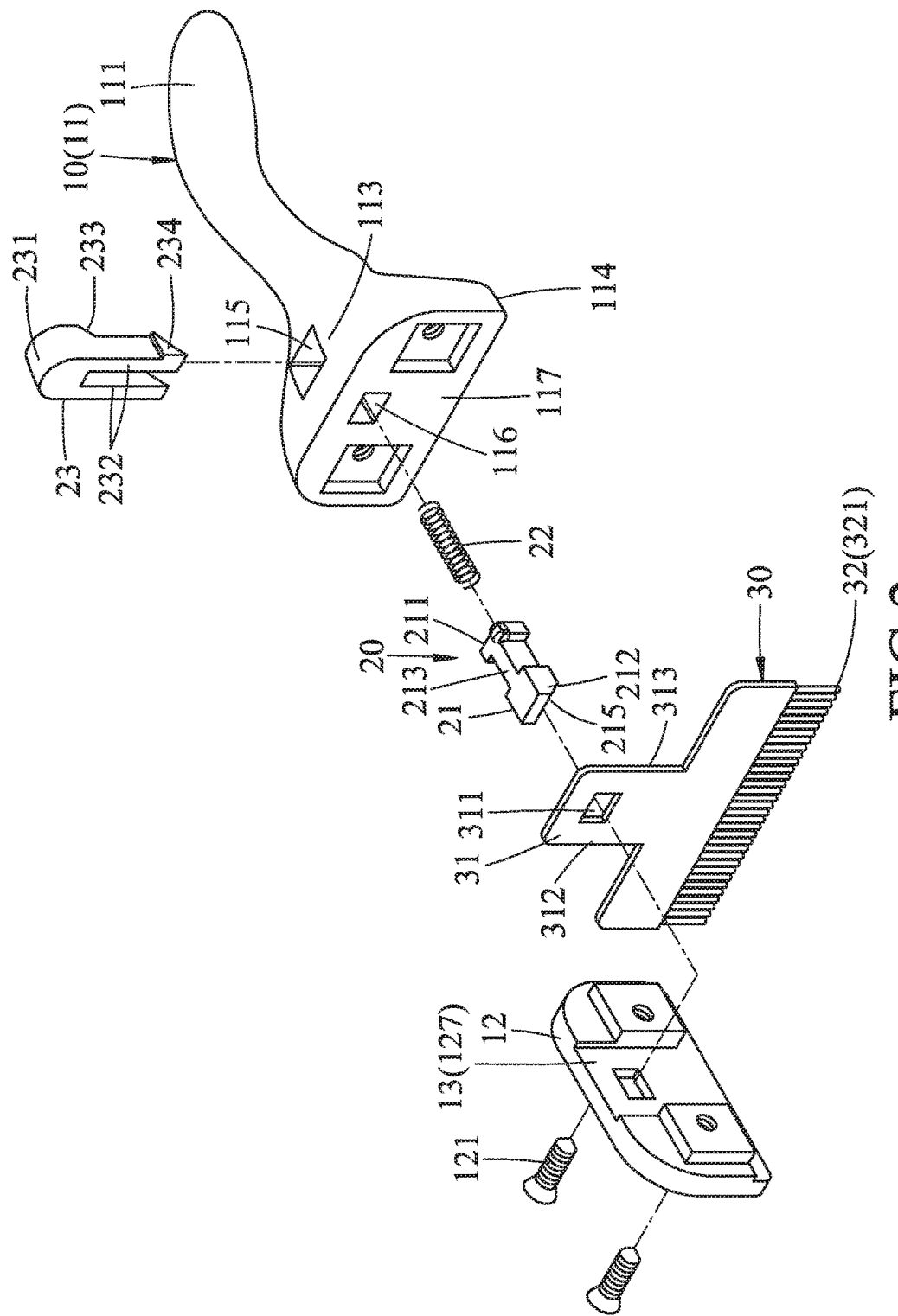
FIG. 2 is an exploded perspective view of the first embodiment.
Figure 3:
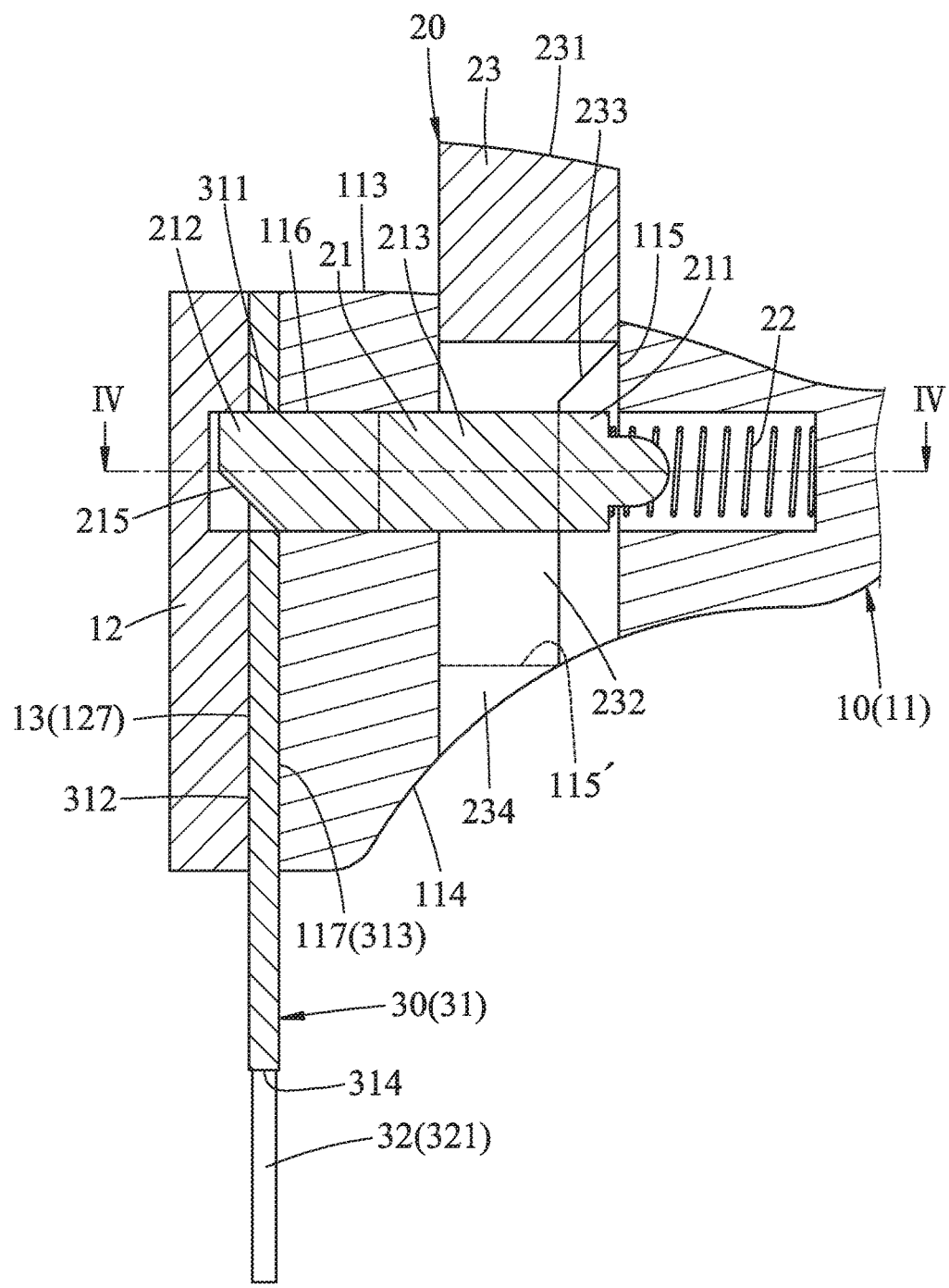
FIG. 3 is a fragmentary sectional view of the first embodiment.

Referring to FIGS. 1 to 3, a first embodiment of a pet grooming tool according to the disclosure is shown to include a tool body 10, a latch unit 20 and a plurality of comb plates 30.

The tool body 10 includes a handle 11 which has a handle portion 111 and which extends from the handle portion 111 in a longitudinal direction to terminate at a rear wall surface 117 that extends in a first transverse direction transverse to the longitudinal direction, and a mounting seat 12 which is secured to the handle 11 by means of screws 121 and which has a front wall surface 127 that extends in the first transverse direction and that is recessed to face and cooperate with the rear wall surface 117 to define an insert slot 13. The rear wall surface 117 of the handle 11 is recessed along a latch displacing path in the longitudinal direction to define a latch displacing space 116 so as to be in spatial communication with the insert slot 13.

The handle 11 has an upper wall 113 and a lower wall 114 opposite to each other in a second transverse direction that is transverse to the latch displacing path. In this embodiment, the second transverse direction coincides with the first transverse direction such that the sliding slot 13 extends from the upper wall 113 through the lower wall 114. Further, a sliding slot 115 extends from the upper wall 113 in the second transverse direction and through the lower wall 114 to be in spatial communication with the latch displacing space 116.

Figure 5:
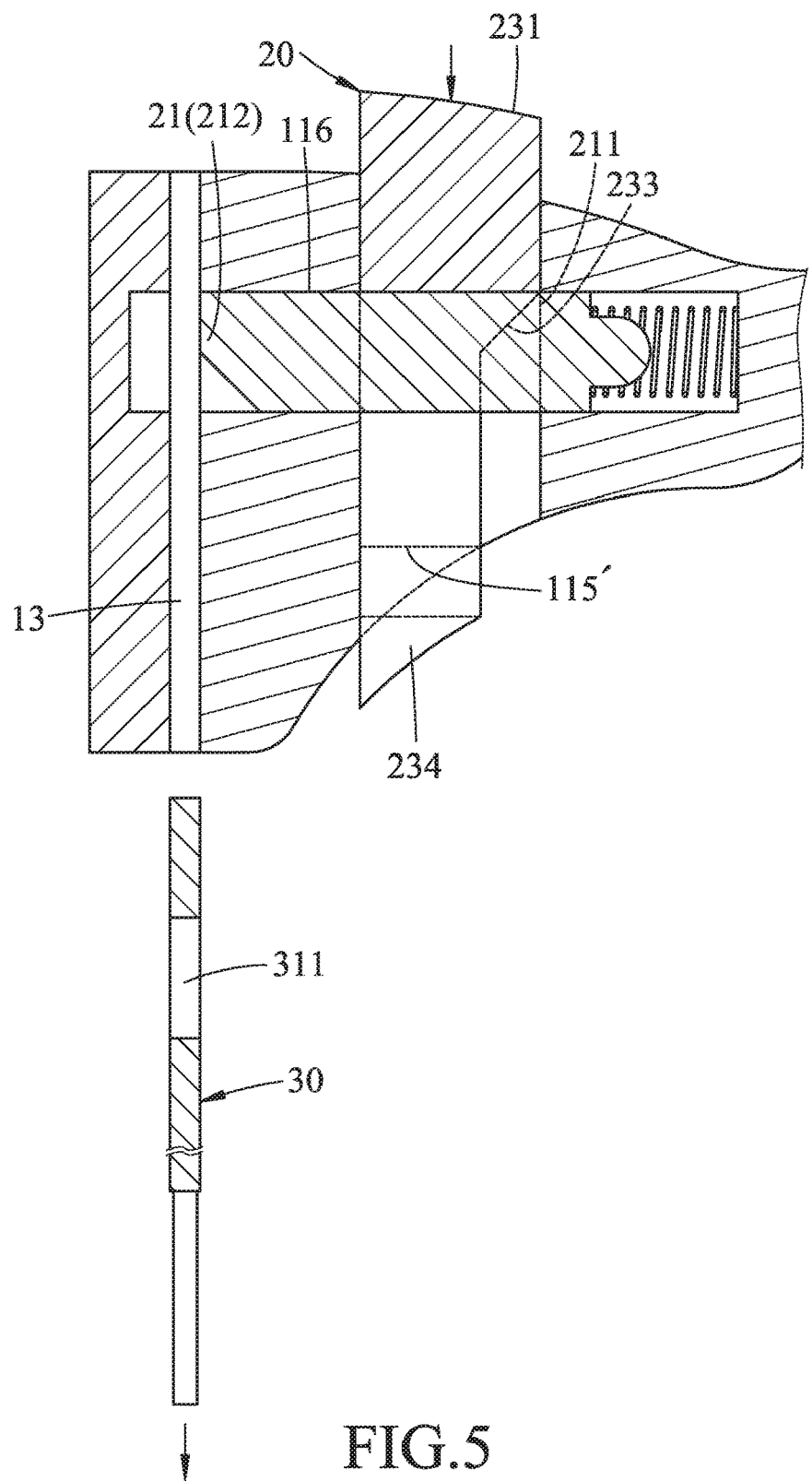
FIG. 5 is a fragmentary sectional view illustrating a state when a latch unit of the first embodiment is operated to an unlatch position.

The latch unit 20 is mounted in the handle 11, and includes a latch member 21 movably disposed in the latch displacing space 116, an operating member 23 movably disposed in the sliding slot 115, and a biasing member 22 disposed in the latch displacing space 116 and remote from the insert slot 13. The latch member 21 has a latch portion 212 which is disposed to be displaceable along the latch displacing path between an unlatch position (as shown in FIG. 5), where the latch portion 212 is disposed in the latch displacing space 116, and a latch position (as shown in FIG. 3), where the latch portion 212 is disposed in the insert slot 13, and a driven portion 211 opposite to the latch portion 212 along the latch displacing path. The biasing member 22, such as a compression spring, is disposed to bias the latch portion 212 of the latch member 21 to the latch position.

Figure 4:
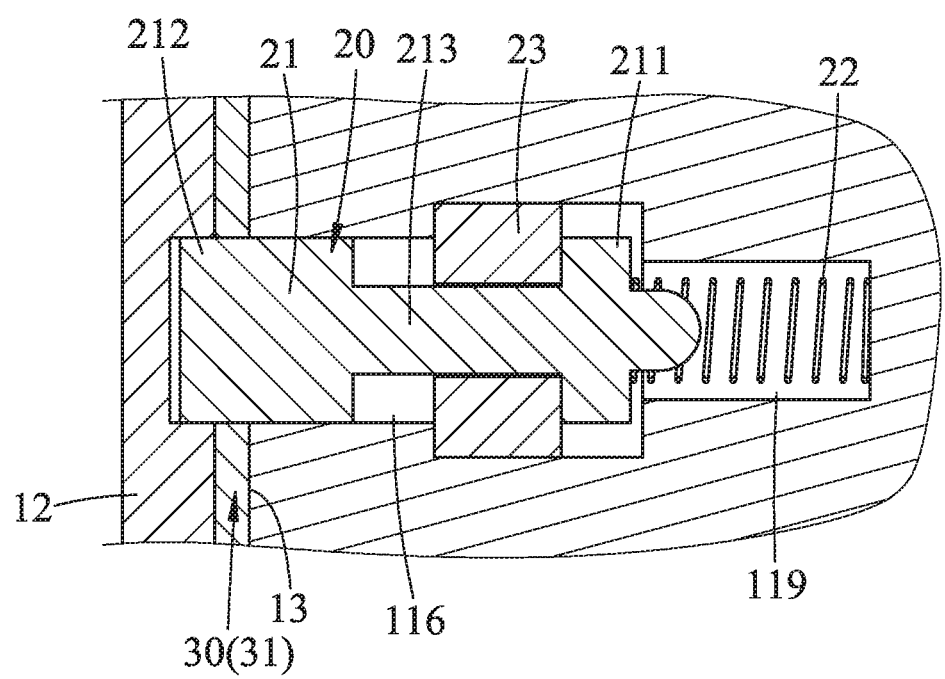
FIG. 4 is a sectional view taken along line IV-IV of FIG. 3.

The operating member 23 has a coupling portion 233 which is disposed in and slidable along the sliding slot 115, an operated portion 231 which projects upwardly of the upper wall 113 of the handle 11, and a pair of resilient dog portions 232 which extend from the coupling portion. 233 is the second transverse direction and which have hook ends 234 that hook on a hook portion 115' of the lower wall 114 when the resilient dog portions 232 pass snugly through the sliding slot 115. The coupling portion 233 is in the form of a slope surface matingly coupled with the driven portion 211 of the latch member 21 such that, when the operating portion 231 is depressed manually toward the upper wall 113, the latch portion 212 is thrust to retreat into the latch displacing space 116 to the unlatch position. Further, the latch member 21 has a neck portion 213 interposed between the latch and driven portions 212, 211 and is retained between the resilient dog portions 232, as shown in FIG. 4.

Figure 12:
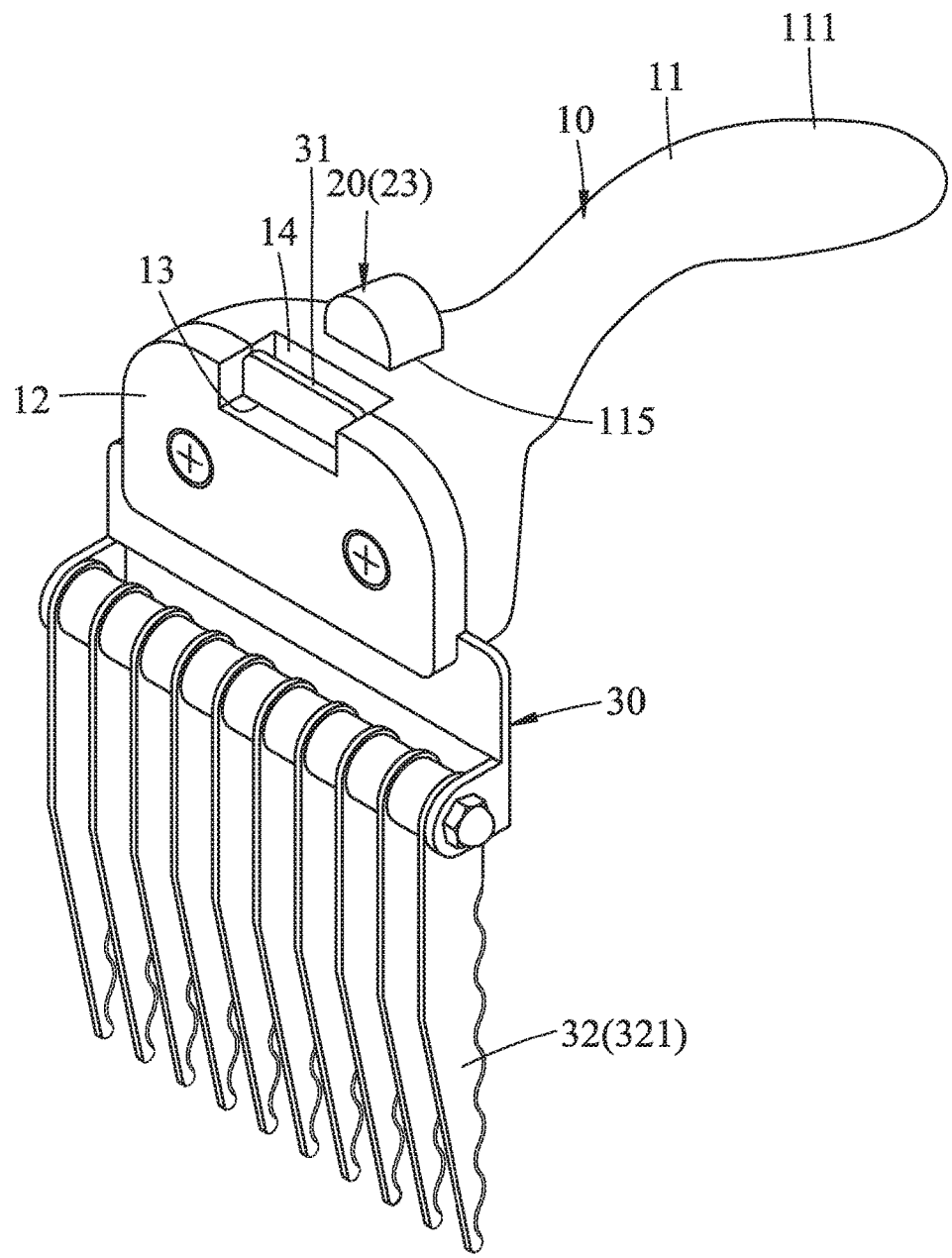
FIG. 12 is a perspective view of a fifth embodiment according to the disclosure.
Figure 13:
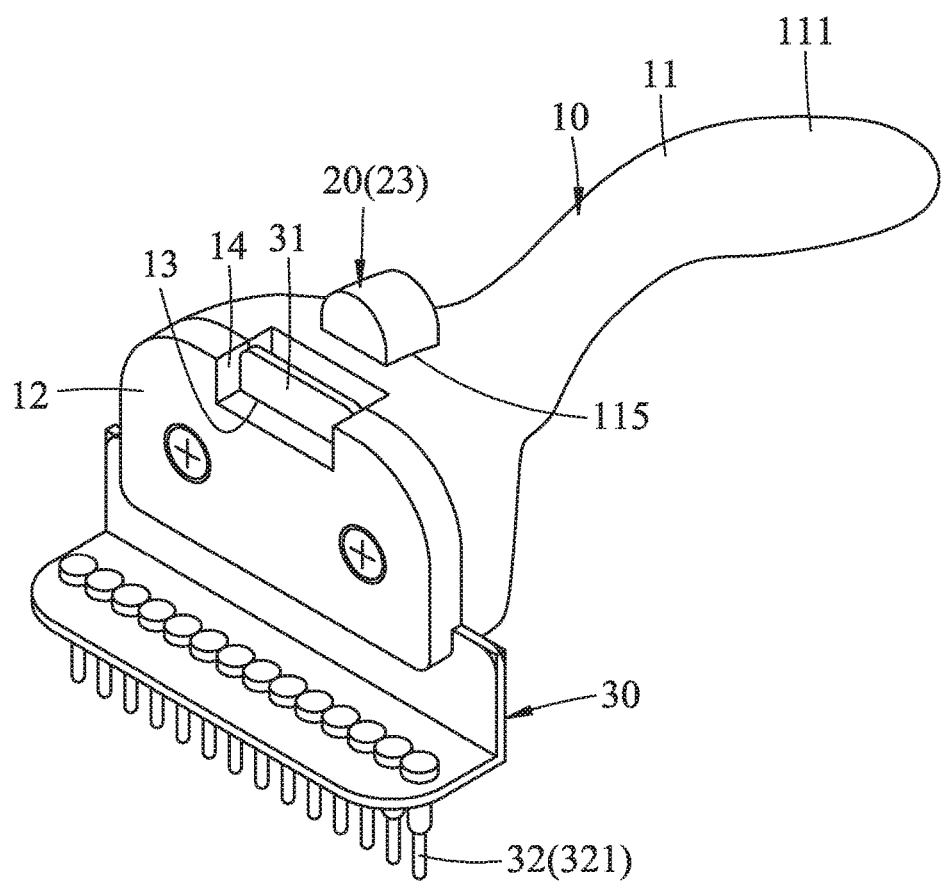
FIG. 13 is a perspective view of a sixth embodiment according to the disclosure.
Figure 14:
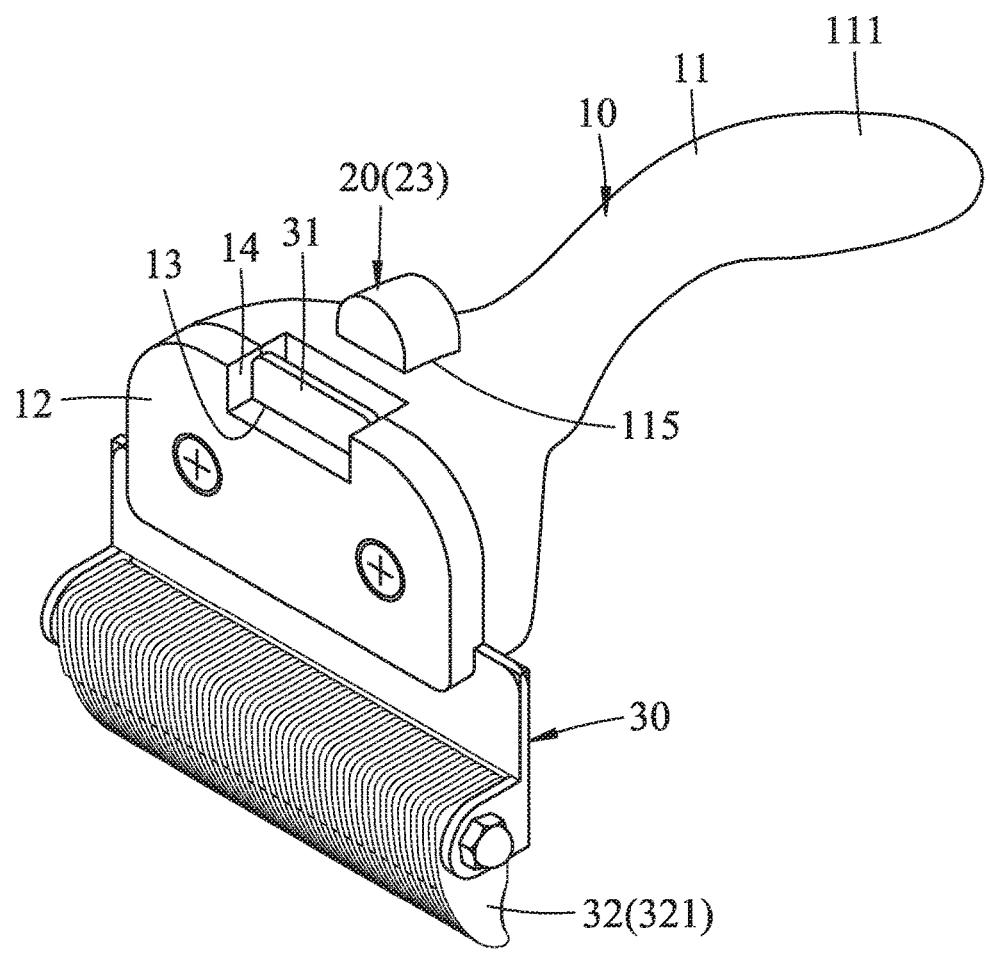
FIG. 14 is a perspective view of a seventh embodiment according to the disclosure.
Figure 15:
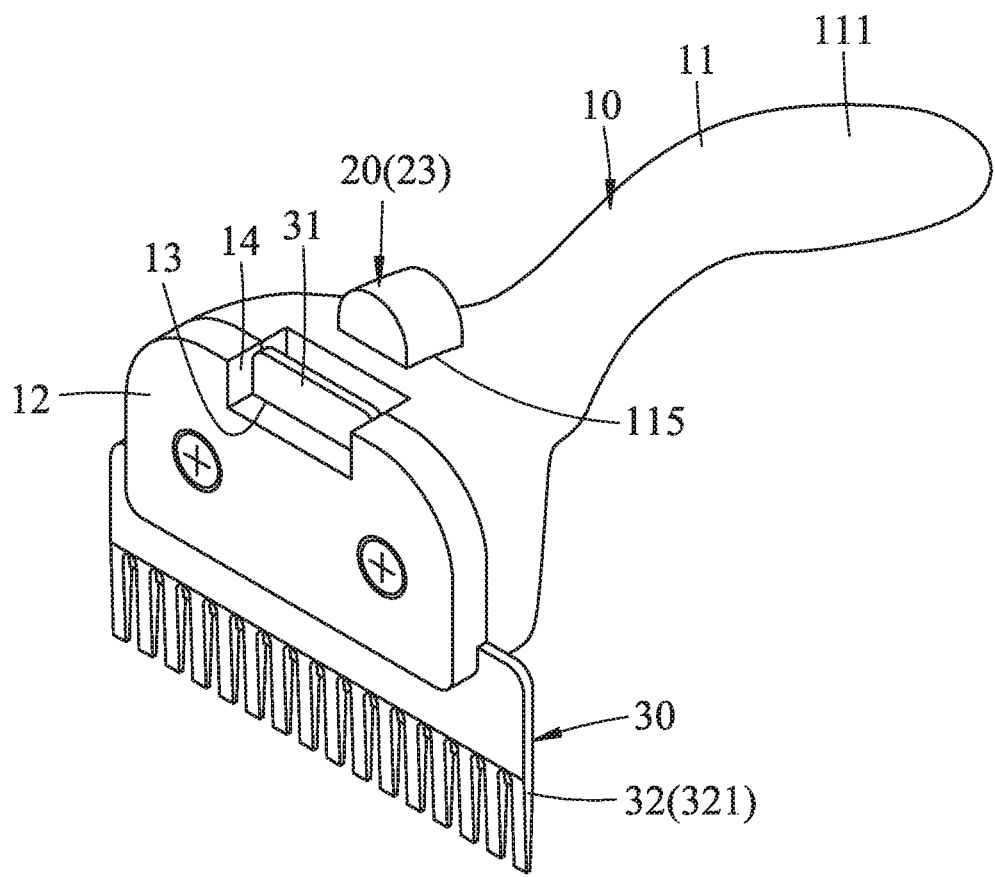
FIG. 15 is a perspective view of an eighth embodiment according to the disclosure.

Each of the comb plates 30 has an insert plate portion 31 which is configured to be inserted into the insert slot 13 in the first transverse direction, and which has two plate major surfaces 312, 313 that are configured to be attached to the front and rear wall surfaces 127, 117, respectively, a latch hole 311 that extends from one of the plate major surface 312 through the other one of the plate major surface 313 and that is registered with the latch displacing path when the insert plate portion 31 is inserted into the insert slot 13 so as to permit retaining of the latch portion 212 in the latch hole 311 when the latch portion 212 is in the latch position, and a plate minor surface 314 that interconnects the plate major surfaces 312, 313, and a comb portion 32 which extends from the plate minor surface 314 in the first transverse direction to project outwardly of the tool body 10. The comb portions 32 of the comb plates 30 have a plurality of teeth 321 which are formed in a variety of shapes for performing different grooming tasks. For example, in FIGS. 2 and 13, the teeth 321 are in the form of needle bars for grooming pets. In FIGS. 12 and 14, the teeth 321 are in the form of dematting blades to cut and remove tangled and matted hair. In FIG. 15, the teeth 321 are in the form of comb teeth for grooming a short-hair pet.

Referring to FIG. 5, by manually pressing the operated portion 231, the latch portion 212 is removed from the latch hole 311 while the hook ends 234 are removed from the hook portion 115' so as to permit detachment of the comb plate 30 from the insert slot 13. Another comb plate 30, such as one of those shown in FIGS. 12 to 15, can be inserted into the insert slot 13 for different use. As shown in FIGS. 2 and 3, the latch portion 212 has a slope surface 215 which is urged to retreat into the latch displacing space 116 during insertion of the comb plate 30 into the insert slot 13.

As illustrated, the pet grooming tool of this embodiment has a simple construction which is easy to fabricate and assemble, thereby reducing the manufacturing cost, and which permits ease of replacement of the comb plates for different applications.

Figure 6:
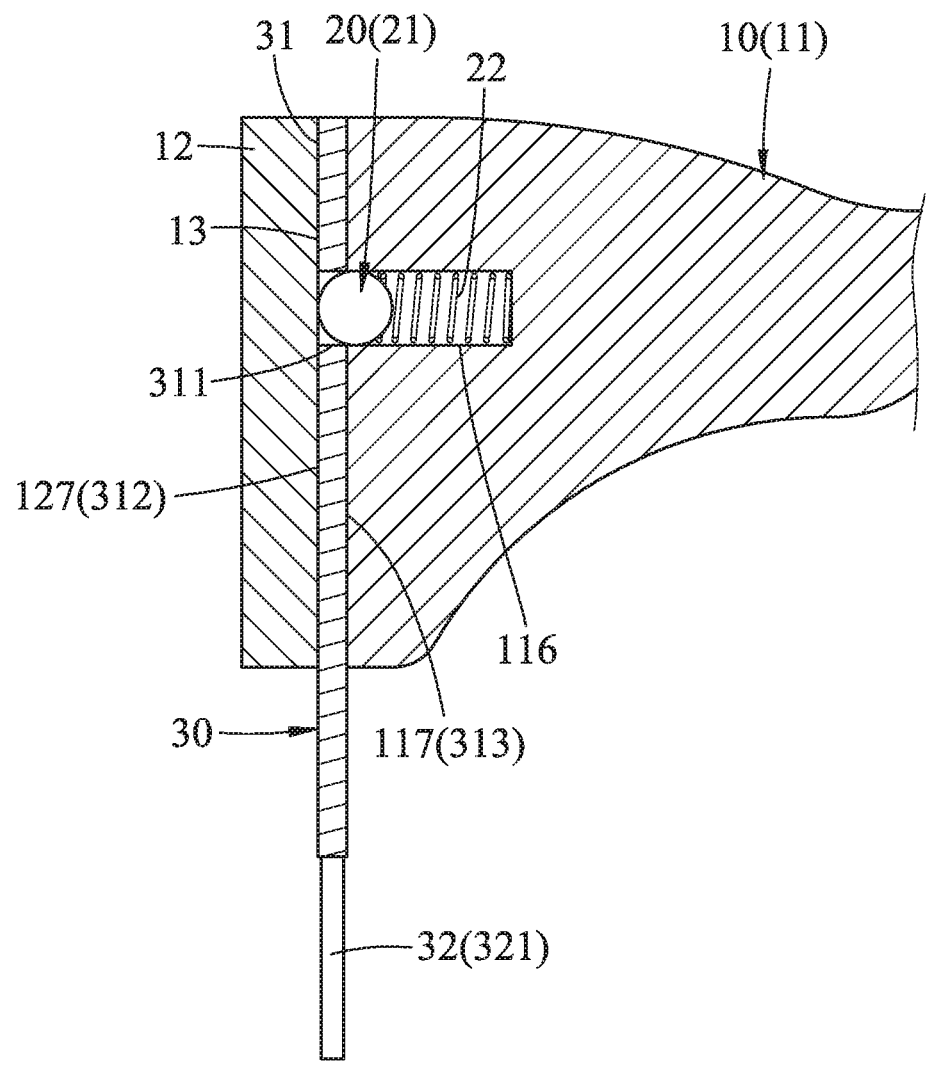
FIG. 6 is a fragmentary sectional view of a second embodiment according to the disclosure.
Figure 7:
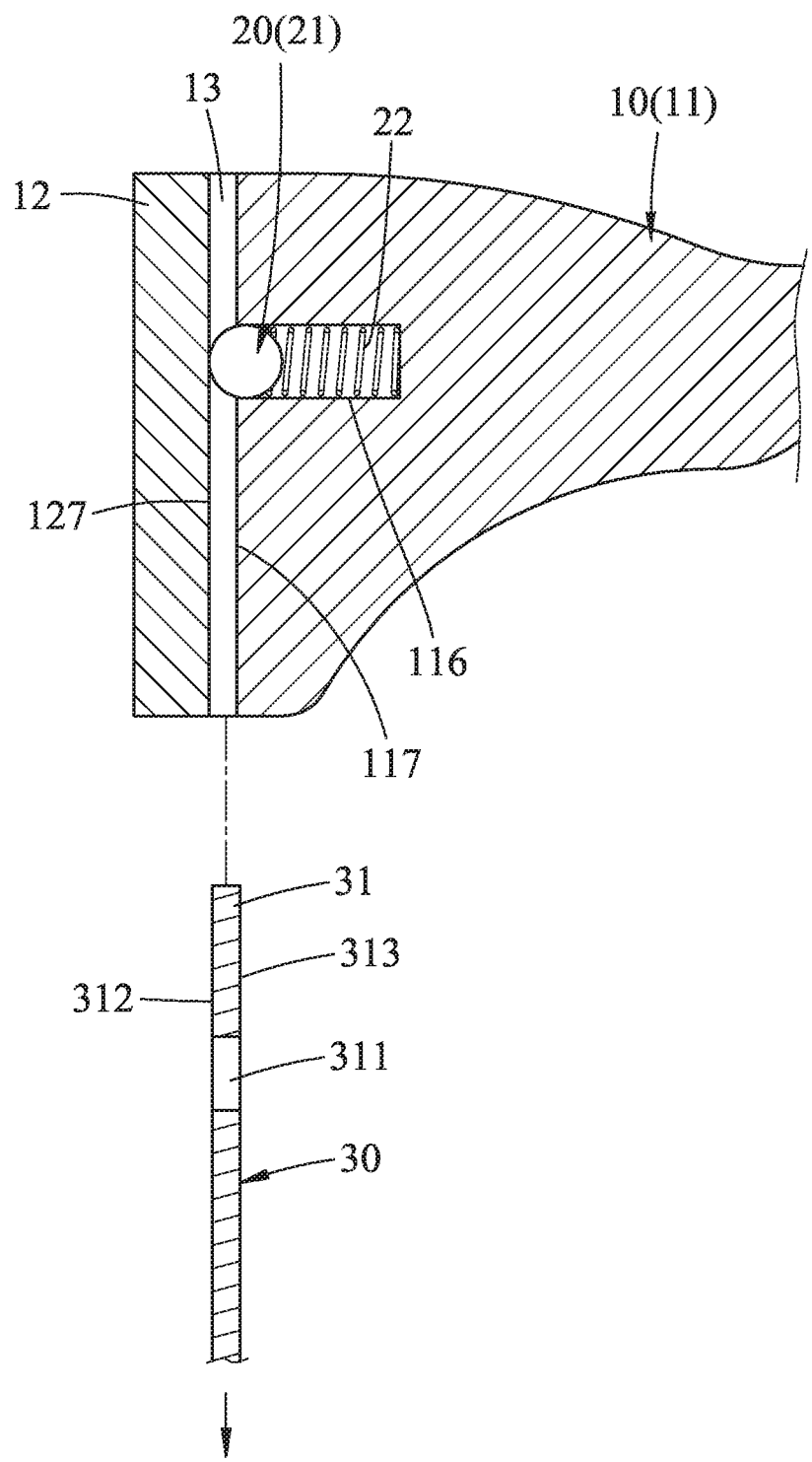
FIG. 7 is a fragmentary sectional view illustrating a state when a comb plate is removed from a tool body of the second embodiment.

Referring to FIGS. 6 and 7, in a second embodiment of the disclosure, the latch member 21 is in the form of a steel ball. The rear wall surface 117 of the handle 11 is recessed to define the latch displacing space 116 and to extend the latch displacing path in the longitudinal direction. When it is desired to replace the comb plate 30 inserted into the insert slot 13, the user can pull the comb plate 30 to permit removal of the latch member 21 from the latch hole 311 against the biasing action of the biasing member 22. Hence, in this embodiment, the operating member 23 (see FIG. 2) is omitted.

Figure 8:
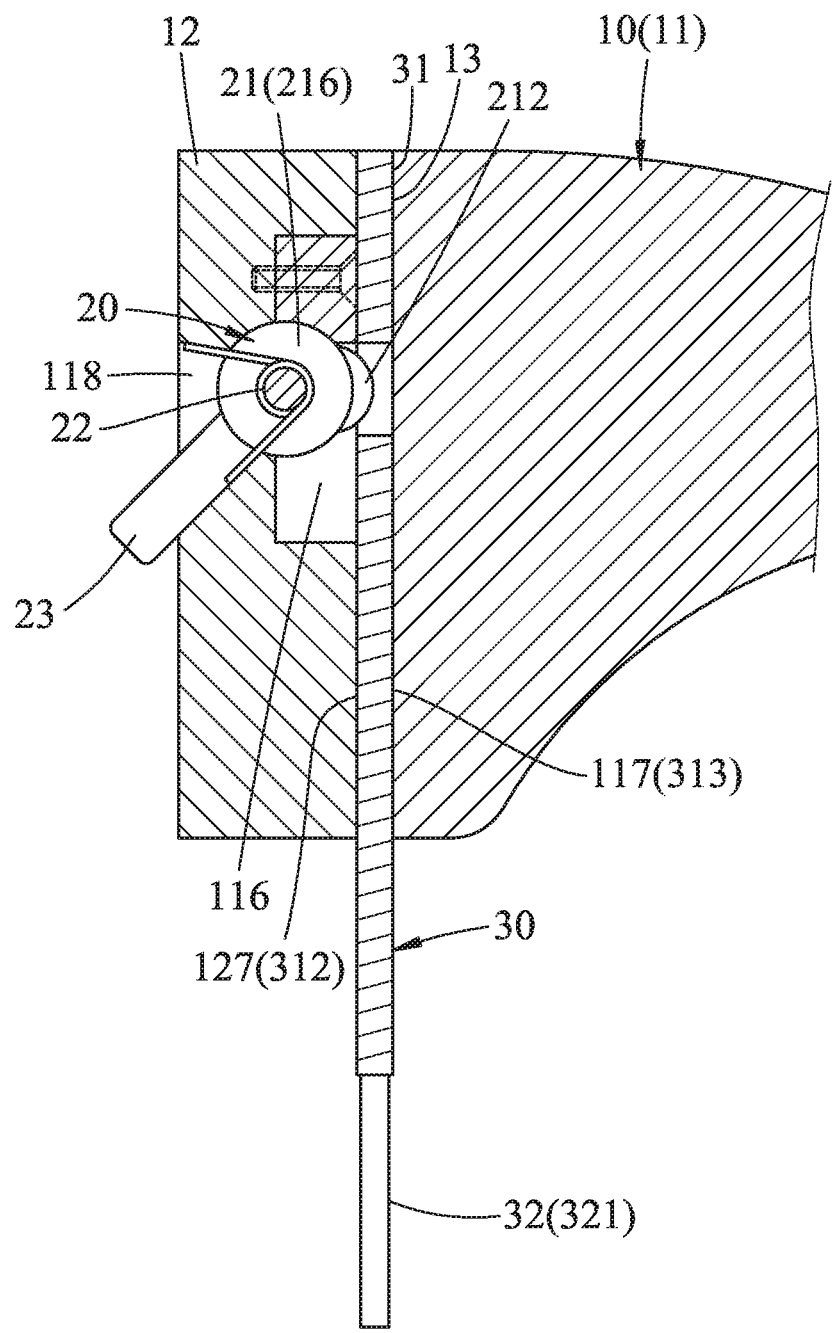
FIG. 8 is a fragmentary sectional view of a third embodiment according to the disclosure.
Figure 9:
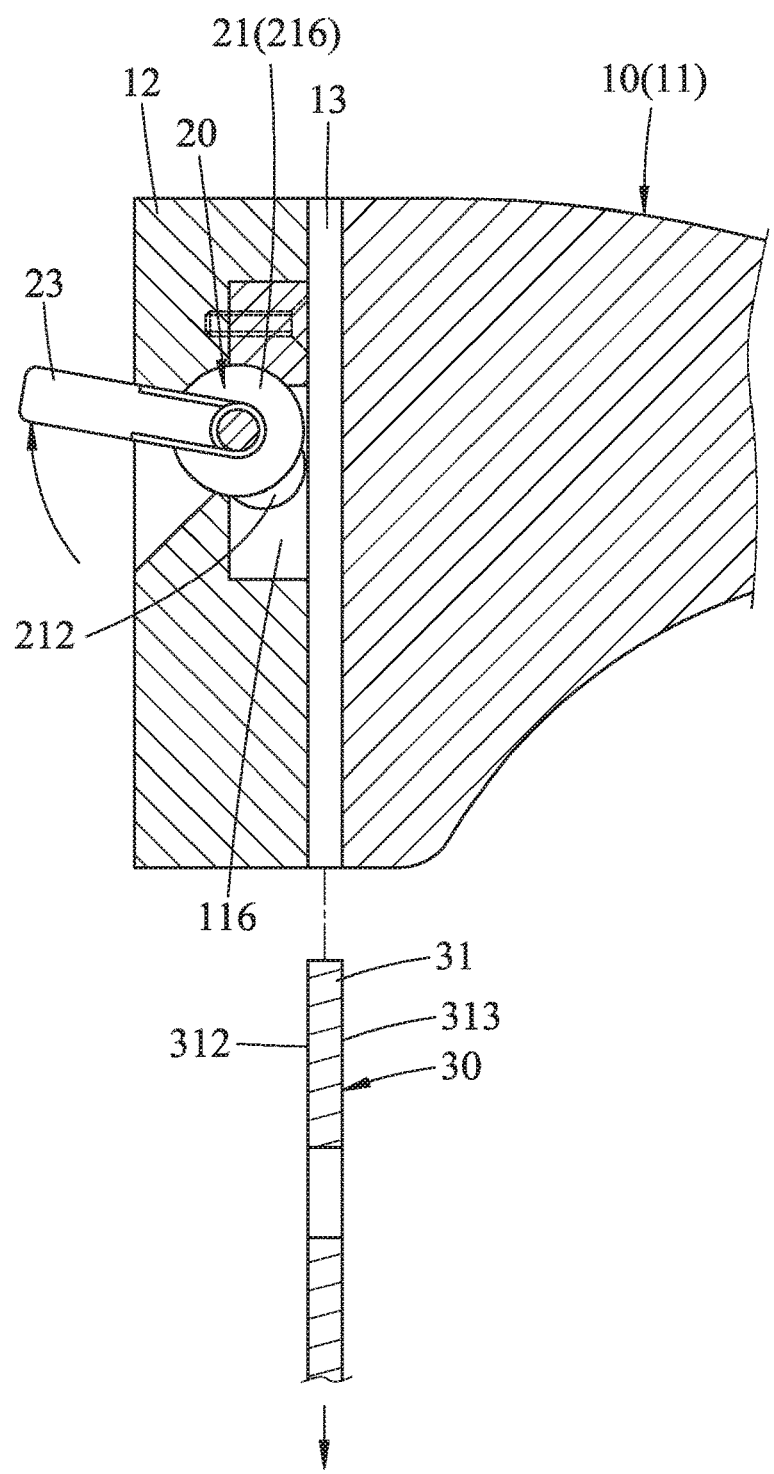
FIG. 9 is a fragmentary sectional view illustrating a state when a latch unit of the third embodiment is operated to an unlatch position.

Referring to FIGS. 8 and 9, in a third embodiment of the disclosure, the front wall surface 127 is recessed to define the latch displacing space 116 in the longitudinal direction. The latch displacing space 116 is configured to have an enlarged opening 118 in a front side of the mounting seat 12. The latch member 21 has a pivot portion 216 which is pivotably mounted on the mounting seat 12. The latch portion 212 extends radially from the pivot portion 216 such that, by turning of the pivot portion 216, the latch portion 212 is displaced between the latch position and the unlatch position. In other words, the latch displacing path is a curve path surrounding the pivot portion 216. The operating member 23 is integrally formed with the latch member 21, extends radially from the pivot portion 216, and is angularly displaced from the latch portion 212 to project outwardly from the opening 118. The biasing member 22 is a coil spring to provide a torque so as to bias the latch portion 212 into the insert slot 13.

Figure 10:
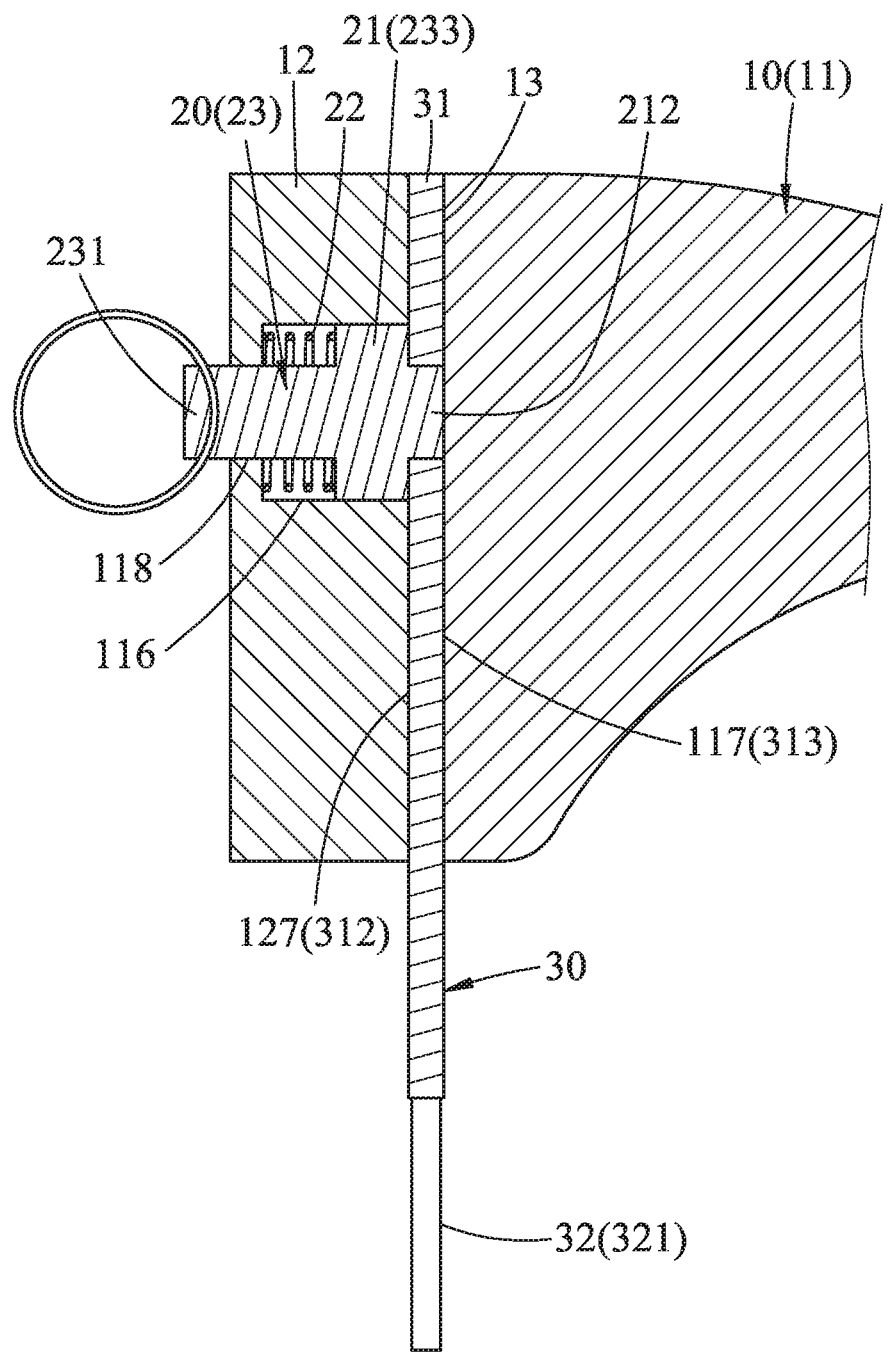
FIG. 10 is a fragmentary sectional view of a fourth embodiment according to the disclosure.
Figure 11:
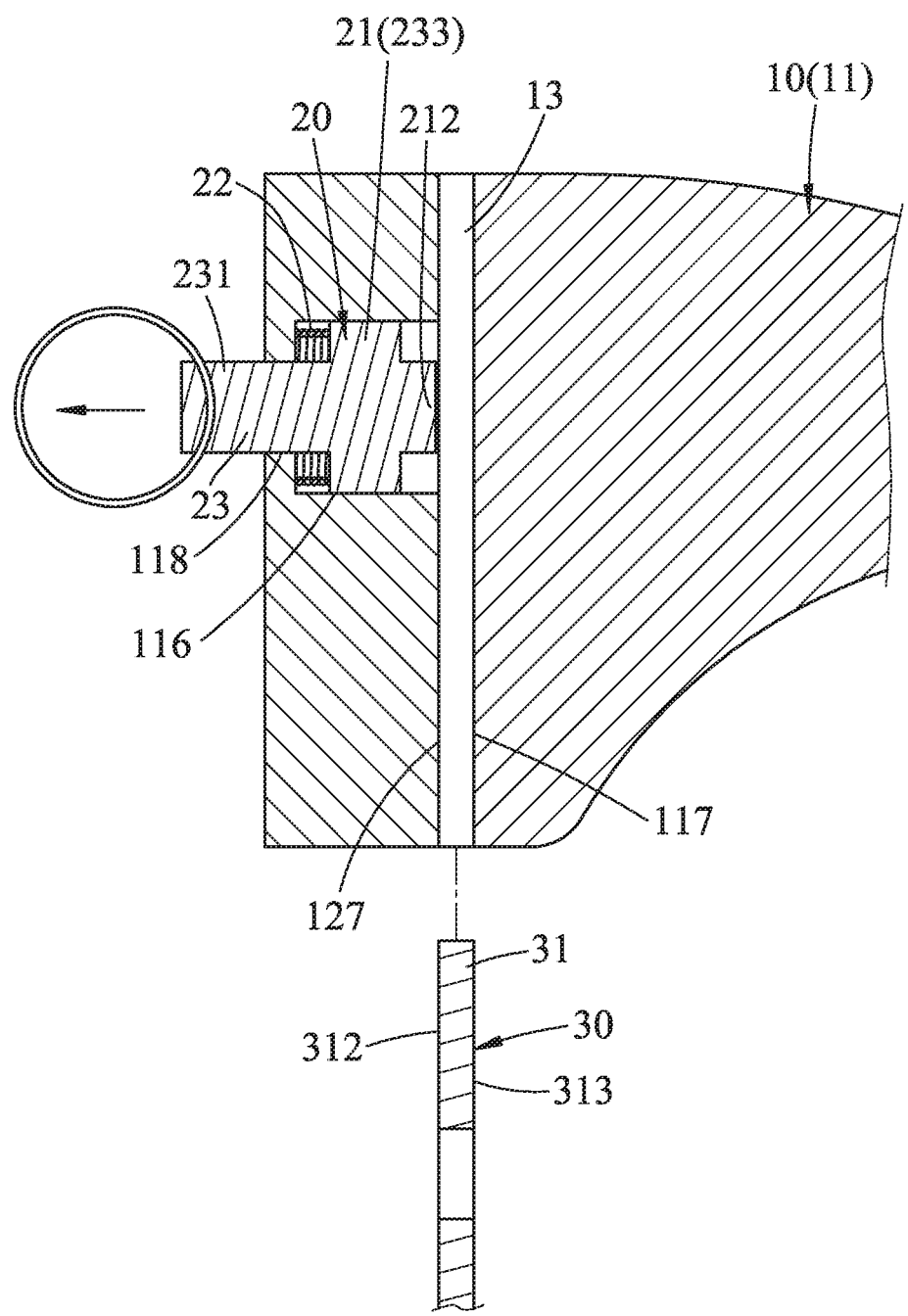
FIG. 11 is a fragmentary sectional view illustrating a state when a latch unit of the fourth embodiment is operated to an unlatch position.

Referring to FIGS. 10 and 11, in a fourth embodiment of the disclosure, the front wall surface 127 is recessed to define the latch displacing space 116 and to extend the latch displacing path in the longitudinal direction. The coupling portion 233 of the operating member 23 is integrally formed with and extends from the latch member 21 in the longitudinal direction to terminate at the operated portion 231 that projects outwardly from the opening 118 of the mounting seat 12 such that, by pulling of the operated portion 231, the latch portion 212 is displaced to retreat into the latch displacing space 116 to the unlatch position.

Referring to FIG. 12, in a fifth embodiment or either one of aforesaid embodiments, the tool body 10 has an access opening 14 which extends to be in communication with the insert slot 13 and which is disposed opposite to the comb portion 32 of the comb plate 30 inserted into the insert slot 13 in the first transverse direction such that the comb plate 30 is accessible from the access opening 14, which facilitates removal of the comb plate 30 from the insert slot 13.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pet grooming tool comprising:
   a tool body having a handle portion and an insert slot which are disposed opposite to each other in a longitudinal direction, said insert slot being defined by front and rear wall surfaces which are disposed opposite to each other in the longitudinal direction and each of which extends in a first transverse direction that is transverse to the longitudinal direction, said tool body further having a latch displacing space which extends therein from said insert slot and which defines a latch displacing path;
   a latch unit including a latch member having a latch portion which is disposed to be displaceable along the latch displacing path between an unlatch position, where said latch portion is disposed in said latch displacing space, and a latch position, where said latch portion is disposed in said insert slot, and a biasing member disposed in said latch displacing space to bias said latch portion to the latch position; and
   a plurality of comb plates, each having an insert plate portion which is configured to be inserted into said insert slot in the first transverse direction, and which has two plate major surfaces that are configured to be attached to said front and rear wall surfaces, respectively, a latch hole that extends from one of said plate major surfaces toward the other one of said plate major surfaces and that is registered with said latch displacing path when said insert plate portion is inserted into said insert slot so as to permit retaining of said latch portion in said latch hole when said latch portion is in the latch position, and a plate minor surface that interconnects said plate major surfaces, and a comb portion which extends from said plate minor surface in the first transverse direction to project outwardly of said tool body.

2. The pet grooming tool as claimed in claim 1, wherein said tool body includes a handle which has said handle portion and which extends from said handle portion in the longitudinal direction to terminate at said rear wall surface, and a mounting seat which has said front wall surface that is recessed to face and cooperate with said rear wall surface to define said insert slot, one of said front and rear wall surfaces being recessed along said latch displacing path to define said latch displacing space.

3. The pet grooming tool as claimed in claim 2, wherein said latch unit further has an operating member disposed in one of said handle and said mounting seat, and having a coupling portion which is coupled with said latch member to make the displacement of said latch portion to the unlatch position, and an operated portion which projects outwardly from said tool body to be manually operable.

4. The pet grooming tool as claimed in claim 3, wherein said handle has an upper wall and a sliding slot which extends from said upper wall in a second transverse direction that is transverse to the latch displacing path, and which is in spatial communication with said latch displacing space, said latch member having a driven portion opposite to said latch portion along said latch displacing path, said coupling portion of said operating member being disposed in and slidable along said sliding slot to have said operated portion projecting upwardly of said upper wall, and being configured such that, when said operating portion is depressed toward said upper wall, said latch portion is thrust to retreat into said latch displacing space to the unlatch position.

5. The pet grooming tool as claimed in claim 4, wherein said handle further has a lower wall which is opposite to said upper wall in the second transverse direction and through which said sliding slot extends, said operating member further having a pair of resilient dog portions which extend from said coupling portion in the second transverse direction and which have hook ends that hook on said lower wall when said resilient dog portions pass snugly through said sliding slot.

6. The pet grooming tool as claimed in claim 2, wherein said latch member is in the form of a steel ball, and said rear wall surface is recessed to define said latch displacing space and to extend said latch displacing path in the longitudinal direction.

7. The pet grooming tool as claimed in claim 2, wherein said tool body has an access opening which extends to be in communication with said insert slot and which is disposed opposite to said comb portion of one of said comb plates inserted into said insert slot in the first transverse direction such that said one of said comb plates is accessible from said access opening.

8. The pet grooming tool as claimed in claim 3, wherein said front wall surface is recessed to define said latch displacing space in the longitudinal direction, said latch member having a pivot portion which is pivotably mounted on said mounting seat, said latch portion extending radially from said pivot portion such that, by turning of said pivot portion, said latch portion is displaced between the latch position and the unlatch position, said operating member extending radially from said pivot portion and angularly displaced from said latch portion.

9. The pet grooming tool as claimed in claim 3, wherein said front wall surface is recessed to define said latch displacing space and to extend said latch displacing path in the longitudinal direction, said coupling portion of said operating member extending from said latch member in the longitudinal direction to terminate at said operated portion that projects outwardly of said mounting seat such that, by pulling of said operated portion, said latch portion is displaced to retreat into said latch displacing space to the unlatch position.

10. The pet grooming tool as claimed in claim 1, wherein said comb portion of at least one of said comb plates has a plurality of teeth in a form of needle bars, said comb portion of at least one of said comb plates having a plurality of teeth in a form of dematting blades.

* * * * *